United States Patent
Faller et al.

(10) Patent No.: US 7,938,056 B2
(45) Date of Patent: May 10, 2011

(54) PNEUMATIC SERVOBRAKE AND DIAPHRAGM THEREFOR

(75) Inventors: Jürgen Faller, Kahl (DE); Ralf Jakobi, Flörsheim (DE)

(73) Assignee: Continental Teves AG & Co. oHG (DE)

( * ) Notice: Subject to any disclaimer, the term of this patent is extended or adjusted under 35 U.S.C. 154(b) by 579 days.

(21) Appl. No.: 11/995,237

(22) PCT Filed: Jul. 21, 2006

(86) PCT No.: PCT/EP2006/064500
§ 371 (c)(1),
(2), (4) Date: Jan. 10, 2008

(87) PCT Pub. No.: WO2007/010031
PCT Pub. Date: Jan. 25, 2007

(65) Prior Publication Data
US 2008/0202327 A1    Aug. 28, 2008

(30) Foreign Application Priority Data

Jul. 22, 2005  (DE) .................. 10 2005 034 959
Dec. 21, 2005  (DE) .................. 10 2005 061 353

(51) Int. Cl.
*F01B 19/02*    (2006.01)
(52) U.S. Cl. .......................................... 92/98 R; 92/99
(58) Field of Classification Search .............. 92/98 R, 92/98 D, 99
See application file for complete search history.

(56) References Cited

U.S. PATENT DOCUMENTS

| 4,587,889 | A | 5/1986 | Ohki et al. | |
| 5,207,142 | A | 5/1993 | Hewitt | |
| 5,235,897 | A | 8/1993 | Watanabe | |
| 5,297,471 | A * | 3/1994 | Boehm et al. | 92/98 R |
| 5,941,610 | A * | 8/1999 | Hayashi et al. | 92/98 D |
| 2005/0092170 | A1 | 5/2005 | Hewitt et al. | |

FOREIGN PATENT DOCUMENTS

| DE | 41 24 683 A1 | 1/1993 |
| DE | 103 59 176 A1 | 12/2004 |
| EP | 1 346 894 A1 | 9/2003 |
| GB | 2 188 700 | 10/1987 |
| GB | 2 328 991 | 3/1999 |

OTHER PUBLICATIONS

Patent Abstract of Japan, Publication No. 08034344 A, date of publication: Feb. 6, 1996, Applicant: Tokico Ltd.

* cited by examiner

*Primary Examiner* — F. Daniel Lopez
(74) *Attorney, Agent, or Firm* — RatnerPrestia

(57) ABSTRACT

A pneumatic brake booster with a booster housing, which comprises a first and a second housing shell and is subdivided into a working chamber and a vacuum chamber by an axially movable wall to which a pneumatic differential pressure can be applied, with the movable wall being formed of a diaphragm plate and a diaphragm abutting thereon that includes a radially inward sealing bead and a radially outward sealing bead for sealing the two chambers and the radially outward sealing bead is compressible between the housing shells. To improve the compression of the radially outward sealing bead, the radially outward sealing bead has a circumferential, uniform rib structure.

10 Claims, 3 Drawing Sheets

PNEUMATIC SERVOBRAKE AND DIAPHRAGM THEREFOR

This application is the U.S. national phase application of PCT International Application No. PCT/EP2006/064500, filed Jul. 21, 2006, which claims priority to German Patent Application No. DE102005034959.5, filed Jul. 22, 2005 and German Patent Application No. DE102005061353.5, filed Dec. 21, 2005, the contents of such applications being incorporated by reference herein.

BACKGROUND OF THE INVENTION

1. Field of the Invention

The present invention relates to a pneumatic brake booster with a booster housing, which comprises a first and a second housing shell and is subdivided into a working chamber and a vacuum chamber by an axially movable wall to which a pneumatic differential pressure can be applied, with the movable wall being formed of a diaphragm plate and a diaphragm abutting thereon that includes a radially inward sealing bead and a radially outward sealing bead for sealing the two chambers, and the radially outward sealing bead is compressible between the housing shells.

2. Description of the Related Art

DE 41 24 683 A1 discloses a pneumatic brake booster of this type. The radially outward sealing bead of the prior-art brake booster is compressed between two substantially radially configured flanges of the housing shells, and an axially arranged flange is formed at the radial flange of the second housing shell and projects over the radial flange of the first housing shell after the two housing shells have been joined. The operative connection of the housing shells is carried out e.g. by connecting the axial flange by way of lanced indentations in an area surmounting the radial flange of the first housing shell. As this occurs, the radially outward sealing bead is deformed during the joining process of the housing shells in such a fashion that excess volume of the sealing bead is displaced from a mounting space between the flanges into the interior of the brake booster.

Tests have shown that the displacement of the excess sealing bead volume will deteriorate the assembly of the diaphragm, and sealing of the two chambers by the diaphragm is no longer ensured. This leakage inevitably causes failure of the brake booster. The compression of the diaphragm between the housing shells in prior art brake boosters is therefore considered worthy of being improved.

SUMMARY OF THE INVENTION

In view of the above, an object of the invention is to provide a generic brake booster with an improved compression of the diaphragm.

According to the invention, this object is achieved in that the radially outward sealing bead includes a circumferential, uniform rib structure. The rib structure ensures stability, on the one hand, and allows reducing the material of the sealing bead, on the other hand, so that the diaphragm can be compressed between the housing shells without excess sealing bead volume. It is hence possible to specifically build up an inner pressure in the sealing bead, safeguarding the seat of the sealing bead in the mounting space between the housing shells that is intended for this purpose. In addition, sealing by the diaphragm is furthermore ensured. Another advantage is achieved in that only the sealing bead of the diaphragm requires being modified, while the remaining components of the brake booster can stay as they are to a large extent.

Furthermore, it is advantageous that when joining the housing shells, the air in the rib gaps is discharged from the mounting space in a purposeful manner, thereby preventing the development of an air cushion.

According to a favorable embodiment of the invention, the rib structure is provided with ribs and rib gaps on a radial inside surface of the sealing bead. In this arrangement, the rib gaps extend only partly over the radial inside surface and only partly over an axial side of the sealing bead, which abuts on a radial flange of the second housing shell, with the result that weakening of the sealing bead due to the rib gaps can be minimized to the greatest possible extent.

Preferably, the housing shells are operatively connected to each other in sections by way of lanced indentations, and at the radial flange of the second housing shell an axially extending flange is formed that includes radially oriented slots slightly overlapping a mounting space of the sealing bead after the housing shells are interconnected. This allows the sealing bead to deform minimally in a radially outward direction, and displacement of excess sealing bead volume into the interior is prevented in addition.

Ease of mounting of the sealing bead is achieved in that a radial outside surface of the sealing bead includes an insertion ramp and the radial inside surface has a conical shape.

A favorable embodiment of the invention provides that the rib structure with ribs and rib gaps is provided on a radial inside surface of the sealing bead and on a radial outside surface, whereby even deformation of the sealing bead results. The ribs can be arranged on the radial inside surface and the radial outside surface so as to be offset relative to each other, or they can be arranged opposite each other according to another favorable embodiment. The last mentioned embodiment involves the special advantage that the sealing bead despite ribs has a relatively stable design on both sides and that a very uniform deformation of the sealing bead is achieved.

To facilitate the mounting of the diaphragm, the ribs can favorably include insertion ramps, or the radial inside surface and the radial outside surface of the sealing bead are provided with a conical configuration.

Preferably, the second housing shell has an axially oriented guiding surface for guiding the sealing bead, allowing the sealing bead to be selectively guided during the assembly and preventing the sealing bead from tilting.

Further, the invention provides a diaphragm for a pneumatic brake booster, which includes a sealing bead of the type illustrated hereinabove.

BRIEF DESCRIPTION OF THE DRAWINGS

Hereinbelow, the invention will be explained by making reference to the accompanying drawings, which show embodiments. In a highly schematic and cross-sectional view in the drawings.

DETAILED DESCRIPTION

Figure 1:
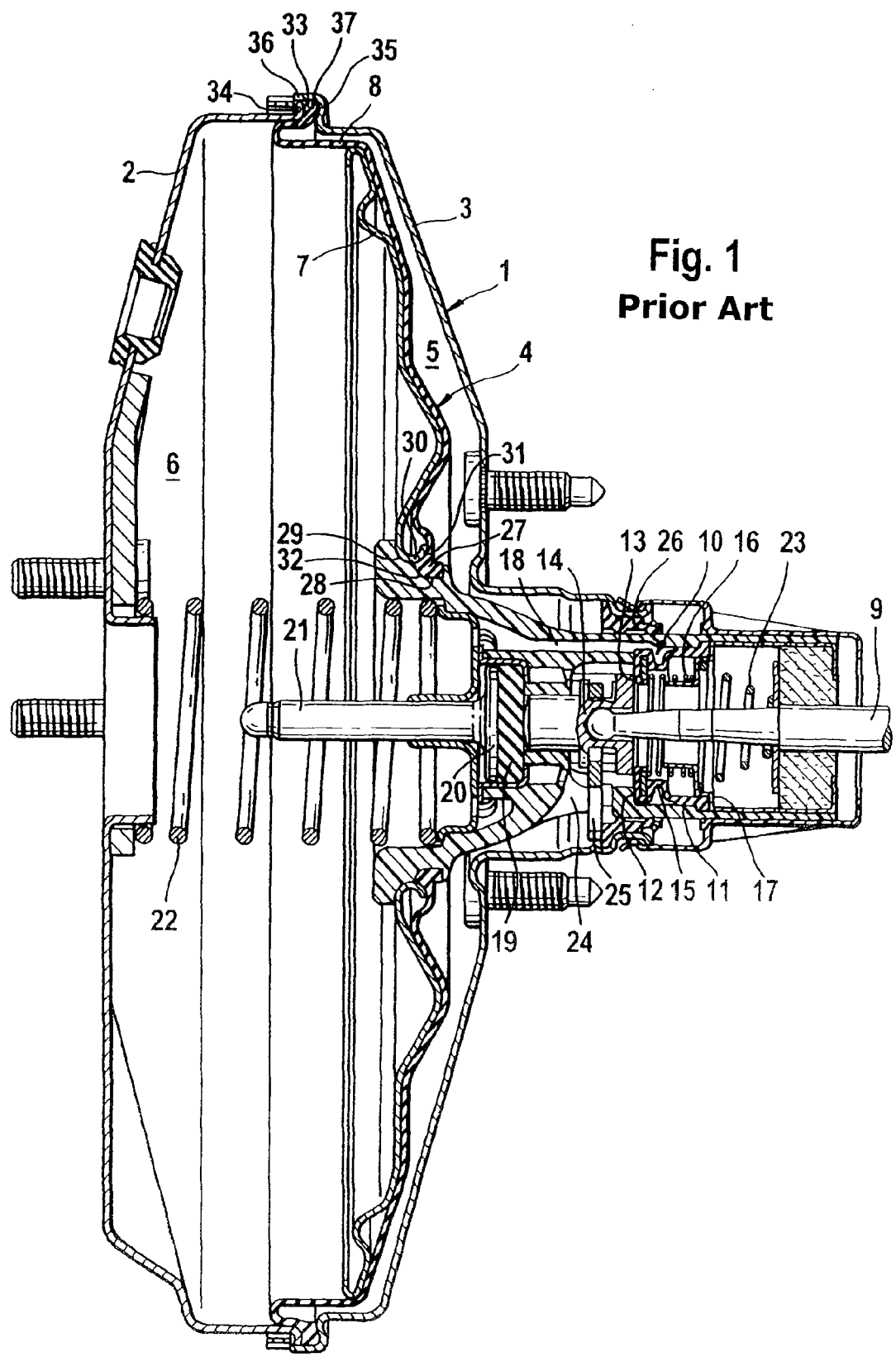
FIG. 1 shows a partial longitudinal cross-sectional view of a prior art pneumatic brake booster.

The booster housing 1 (shown only schematically) of a prior art pneumatic brake booster of a motor vehicle brake system, as shown in FIG. 1, comprises a first housing shell 2 and a second housing shell 3 being operatively press fitted to each other by means of non-cutting shaping provisions such as connection by lanced indentations. The booster housing 1 is subdivided by means of an axially movable wall 4 into a working chamber 5 and a vacuum chamber 6. The axially movable wall 4 is composed of a diaphragm plate 7, e.g. deepdrawn of sheet metal, and a flexible diaphragm 8 abutting thereon and forming a rolling diaphragm between the outside periphery of the diaphragm plate 7 and the booster housing 1 as a sealant of the two chambers 5, 6 in relation to each other and of the two chambers 5, 6 towards the atmosphere.

A control valve 10 being operable by an input member 9 is accommodated in a control housing 11, that is sealed and guided in the booster housing 1 and carries the movable wall 4, and comprises a first sealing seat 12 designed on the control housing 11, a second sealing seat 13 that is designed on a valve piston 14 connected to the input member 9, and a valve member 15, which cooperates with both sealing seats 12, 13 and is urged by a valve spring 16 against the valve seats 12, 13. As can be seen in FIG. 1, the valve spring 16 is supported on a holding sleeve 17 arranged in the control housing 11. The working chamber 5 can be connected to the vacuum chamber 6 by way of channel 18 that extends laterally in the control housing 5. Furthermore, the input member 9 is connected to a brake pedal (not shown).

By way of a rubber-elastic reaction disc 19 that abuts frontally on the control housing 11 and a push rod 21 having a head flange 20, brake force is transmitted to an actuating piston of a master cylinder (not shown) of the brake system, which is mounted at the vacuum-side end of the brake booster. The input force introduced at the input member 9 is transmitted to the reaction disc 19 by means of the valve piston 14.

A restoring spring 22, which is supported on the vacuum-side end wall of the booster housing 1, maintains the movable wall 4 in the initial position shown. In addition, a return spring 23 is provided, which is arranged between the input member 9 and the holding sleeve 17, and the force of which produces a bias of the valve piston 14 or its valve seat 13 relative to the valve member 15.

In order to connect the working chamber 5 to the atmosphere when the control valve 10 is operated, a channel 24 that extends roughly in a radial direction is provided in the control housing 11. The return movement of the valve piston 14 at the end of a brake operation is limited by a transverse member 25, which bears against a sliding ring seal 26 that guides and seals the control housing 11 in the booster housing 1. Alternatively, the transverse member 25 can also move to abut directly on the booster housing 1.

The valve member 15 also can include an annular sealing surface, which cooperates with the two sealing seats 12, 13, which is reinforced by a metallic reinforcing disc and includes several axial passages. A pneumatic chamber is delimited in the control housing 11. For example, an annular reinforcing element, being U-shaped in cross-section, can be arranged in the valve member 15, on which reinforcing element the valve spring 16 is supported and which includes several openings provided opposite to the passages of the valve member 15. The flow ducts being provided by the passages and the openings can connect the pneumatic chamber to an annular chamber that is delimited by the sealing seats 12, 13 and into which the above-mentioned pneumatic channel 24 opens so that the pneumatic chamber, which is arranged on a side of the valve member 15 remote from the sealing surface, is in constant communication with the working chamber 5, and pressure balance takes place at the valve member 15.

The diaphragm 8 of the prior art brake booster includes a radially inward sealing bead 27, which is mounted into a circumferential groove 28 of the control housing 11 with the aid of a radially inwards directed bias. Subsequent to the groove 28 is a supporting surface 29 for a radially inward area of the diaphragm plate 7, which is designed as an annular bulge 30, with the contour of the supporting surface 29 corresponding to the curved shape of the bulge 30. The radially inward sealing bead 27 is likewise provided with a curved abutment surface 31 for abutment on the bulge 30 of the diaphragm plate 7. Furthermore, the circumferential groove 28 includes a curvature 32 shaped like a circular segment and cooperating with the curved abutment surface 31 of the sealing bead 27.

As can be taken from FIG. 1, the diaphragm 8 includes a radially outward sealing bead 33, which is compressed between two substantially radially designed flanges 34, 35 of the housing shells 2, 3. Shaped at the radial flange 35 of the second housing shell 3 is an axially designed flange 36, which surmounts the radial flange 34 of the first housing shell 2 after mounting the two housing shells 2, 3. The operative connection of the housing shells 2, 3 is e.g. carried out by connecting the axial flange 36 by way of lanced indentations. As is apparent, the radially outward sealing bead 33 is deformed in such a way when the housing shells 2, 3 are joined that excess volume of the sealing bead 33 is displaced out of a mounting space 37 between the flanges 34, 35, 36 into an inner space of the brake booster. Tests have shown that the displacement of the excess volume of the sealing bead 33 causes impairment of the assembly of the diaphragm 8, and sealing of the two chambers 5, 6 by the diaphragm 8 is not safeguarded. This leakage inevitably causes failure of the brake booster.

The mode of operation and the basic design of the subsequently described embodiments of the invention do not differ from the mode of operation and from the basic design of the prior art brake booster as described according to FIG. 1 so that only those parts that are essential for the invention will be illustrated and described in the following. Equal components have been assigned like reference numerals and will not be described in the following.

Figure 2A:
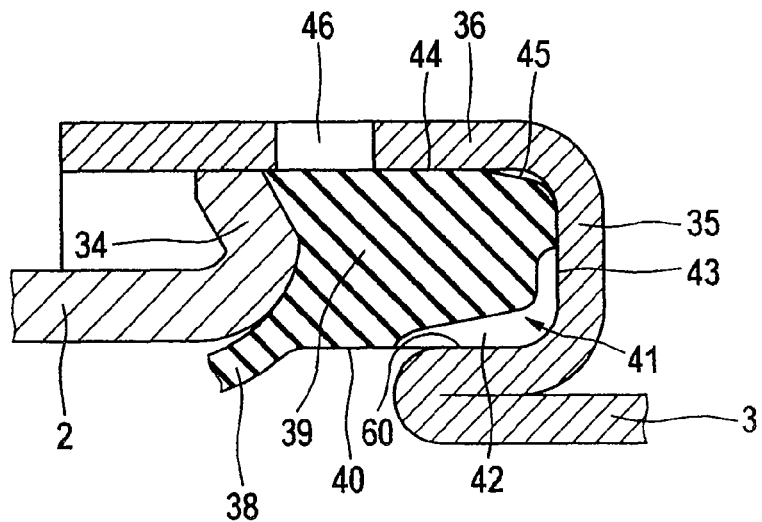
FIG. 2a shows a longitudinal cross-sectional view of a cutout of a first embodiment of a pneumatic brake booster of the invention before the two housing half shells of the booster housing are operatively connected.
Figure 2B:
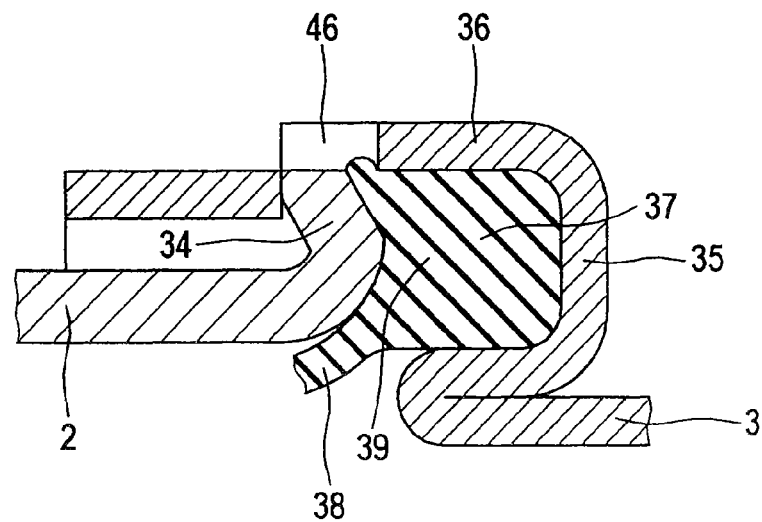
FIG. 2b shows the cutout according to FIG. 2a after the operative connection of the housing half shells.
Figure 2C:
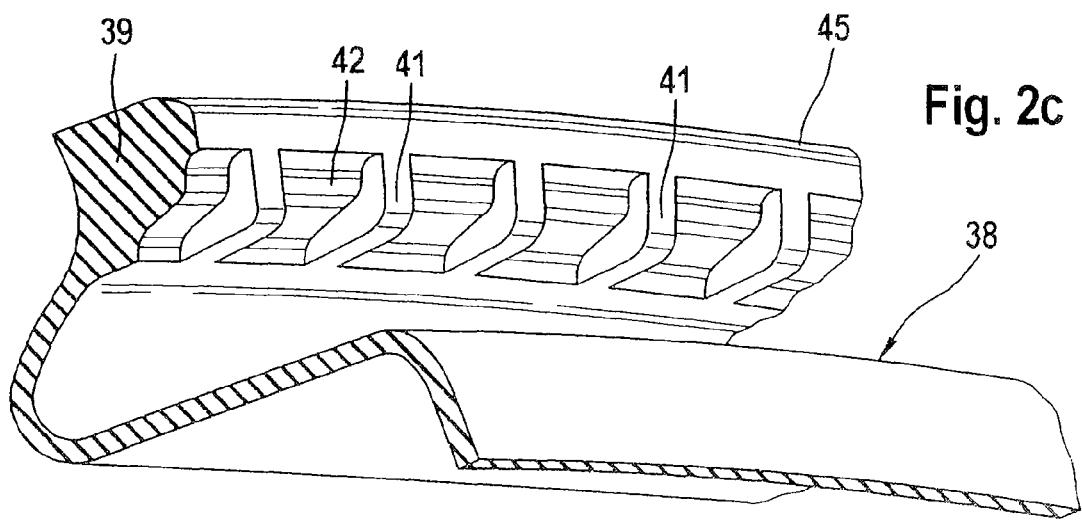
FIG. 2c shows a three-dimensional view of a cutout of a diaphragm of the first embodiment according to FIGS. 2a and 2b.

FIG. 2 illustrates a cutout of a first embodiment of a brake booster according to the invention, and FIG. 2a shows the cutout before the housing shells 2, 3 are connected by way of lanced indentations, FIG. 2b shows the cutout after the housing shells 2, 3 have been connected by way of lanced indentations, and FIG. 2c is a three-dimensional view of a cutout of a diaphragm 38 with a radially outward sealing bead 39 of the first embodiment.

As can be seen in FIGS. 2a and 2c in particular, the sealing bead 39 includes at a radial inside surface 40 a circumferential rib structure with ribs 41 and rib gaps 42. The ribs 41 are arranged at an even distance from one another and ensure that the sealing bead volume stays in the mounting space 37 provided between the flanges 34, 35, 36, as shown in FIG. 2b, when the two housing shells 2, 3 are joined, and no excess volume is displaced into the interior. As can be taken from FIGS. 2a and 2c, the rib gaps 42 extend only partly over the radial inside surface 40 and only partly over an axial side 43 of the sealing bead 39 that abuts on the radial flange 35. The advantage of the described rib structure involves a stabilization of the sealing bead, since the ribs 41 safeguard the correct seat in the mounting space 37. In addition, material economy of the sealing bead 39 is possible so that excess sealing bead volume is prevented from developing.

In contrast to the prior art brake booster according to FIG. 1, the second housing shell 3 includes an axially oriented guiding surface 60, which serves for guiding the sealing bead 39 during the assembly in a targeted manner. Further reshaping arrangements to the second housing shell 3 are unnecessary.

On a radial outside surface 44 of the sealing bead 39, the latter includes an insertion ramp 45 on a side facing the radial flange 35, which facilitates the mounting of the sealing bead 38. The assembly is further facilitated by a slightly conical design of the radial inside surface 40.

Furthermore, it is advantageous that the air in the rib gaps 42 is purposefully discharged from the mounting space 37 when the housing shells 2, 3 are joined, with the result that an air cushion cannot develop and sufficient space is available for the sealing bead volume in the mounting space 37.

In the event of a sectionwise connection of the housing shells 2, 3 by way of lanced indentations, the second housing shell 3 has radially oriented slots 46 in the area of the axial flange 36, which slots are positioned in such a fashion that the slots 46 slightly overlap the mounting space 37 after joining of the housing shells 2, 3 so that the sealing bead 39 can deform in a radially outward direction to a minimum extent, and excess sealing bead volume is prevented from being displaced into the interior in addition.

The following two embodiments differ from the embodiment described above only in the design of the sealing bead so that the description of the second and third embodiment is limited to this issue. The advantages mentioned with regard to the first embodiment likewise apply to the subsequent embodiments.

Figure 3:
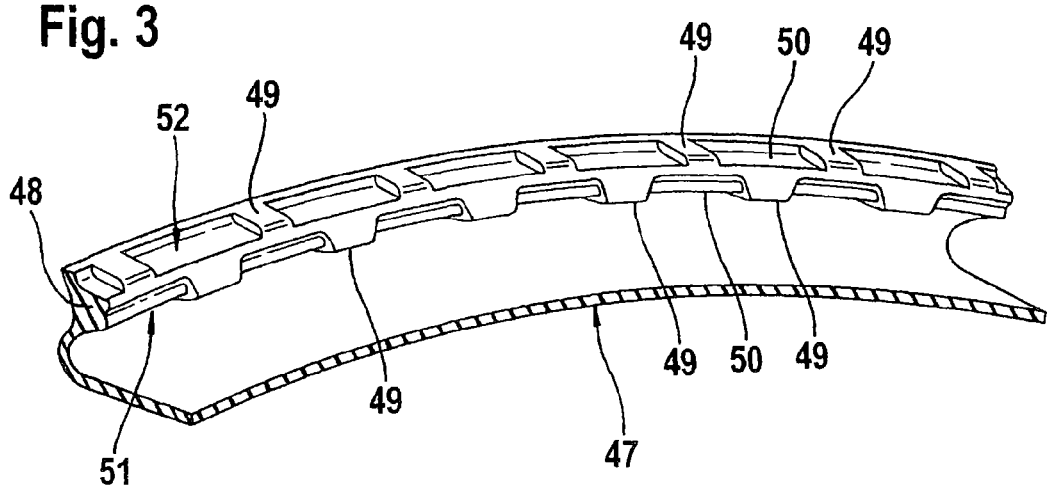
FIG. 3 is a three-dimensional view of a cutout of a diaphragm of a second embodiment.

FIG. 3 is a three-dimensional view of a cutout of a diaphragm 47 of a second embodiment. It can be seen that the diaphragm 47 can include a radially outward sealing bead 48 with ribs 49 and rib gaps 50, and the ribs 49 and ribs gaps 50 are provided in each case offset relative to one another at a radial inside surface 51 and a radial outside surface 52. In this embodiment, too, the inside surface 51 and the outside surface 52 can have a slightly conical design in order to facilitate the assembly of the diaphragm 47. In addition, the ribs 49 can have insertion ramps for this purpose.

Figure 4A:
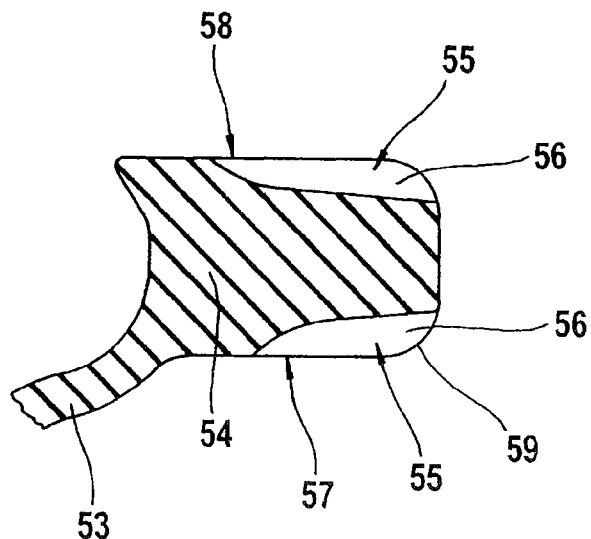
FIG. 4a is a longitudinal view of a cutout of a diaphragm of a third embodiment.
Figure 4B:
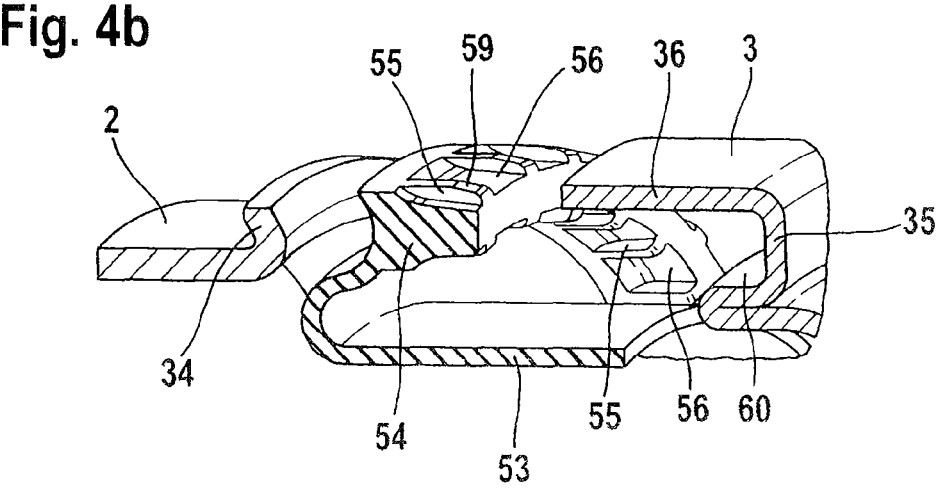
FIG. 4b shows a three-dimensional view of the cutout of the diaphragm according to FIG. 4a before the housing half shells are operatively connected.

FIGS. 4a and 4b depict a third embodiment, whose diaphragm 53 includes a radially outward sealing bead 54 with a circumferential rib structure, i.e. ribs 55 and rib gaps 56. As becomes apparent from FIG. 4a in particular, the ribs 55 and the rib gaps 56 are respectively arranged opposite each other at a radial inside surface 57 and a radial outside surface 58. Furthermore, the inside surface 57 and the outside surface 58 can have a slightly conical design or include insertion ramps 59 for improving the assembly, as has been described hereinabove with regard to the first two embodiments.

Especially the third embodiment of the brake booster with ribs 55 lying on top of each other has proved particularly favorable in terms of stabilizing the sealing bead 54, the rib structure safeguarding a correct seat of the sealing bead 54 in the mounting space 37 after the housing shells 2, 3 have been joined, since the opposite ribs 55 properly stabilize the sealing bead 54 in spite of the material being weakened due to the rib gaps 56, allowing a very uniform deformation of the sealing bead.

The invention claimed is:

1. Pneumatic brake booster with a booster housing comprising a first and a second housing shell that are connected to each other to form an exterior of the booster housing, the booster housing is subdivided into a working chamber and a vacuum chamber by an axially movable wall, with the movable wall being formed of a diaphragm plate and a diaphragm abutting thereon, the diaphragm including a radially inward sealing bead and a radially outward sealing bead for sealing the two chambers with the radially outward sealing bead compressible between the housing shells, wherein the radially outward sealing bead has a circumferential, uniform rib structure with ribs and rib gaps on a radial inside surface of the sealing bead, wherein the rib gaps extend only partly over the radial inside surface and only partly over an axial side of the sealing bead, and the ribs abut a radial flange of the second housing shell.

2. Pneumatic brake booster as claimed in claim 1, wherein the housing shells are operatively connected to each other in sections by way of lanced indentations, and at the radial flange of the second housing shell an axially extending flange is formed that includes radially oriented slots slightly overlapping a mounting space of the sealing bead after the housing shells are interconnected.

3. Pneumatic brake booster as claimed in claim 2, wherein a radial outside surface of the sealing bead includes an insertion ramp and the radial inside surface has a conical shape.

4. Pneumatic brake booster as claimed in claim 1, wherein the second housing shell includes an axially oriented guiding surface for guiding the sealing bead.

5. Pneumatic brake booster as claimed in claim 1, wherein radial flanges of the first and second housing shells are coupled together, and the radially outward sealing bead of the diaphragm is sandwiched between the radial flanges of the first and second housing shells.

6. Pneumatic brake booster with a booster housing comprising a first and a second housing shell that are connected to each other to form the booster housing, the booster housing is subdivided into a working chamber and a vacuum chamber by an axially movable wall, with the movable wall being formed of a diaphragm plate and a diaphragm abutting thereon, the diaphragm including a radially inward sealing bead and a radially outward sealing bead for sealing the two chambers with the radially outward sealing bead compressible between the housing shells, wherein the radially outward sealing bead has a circumferential, uniform rib structure with ribs and rib gaps on a radial inside surface of the sealing bead, and on a radial outside surface, wherein the rib gaps extend only partly over the radial inside surface and only partly over an axial surface of the sealing beads, and the ribs abut a radial flange of the second housing shell.

7. Pneumatic brake booster as claimed in claim 6, wherein the ribs are arranged on the radial inside surface and the radial outside surface so as to be offset relative to each other.

8. Pneumatic brake booster as claimed in claim 7, wherein the ribs include insertion ramps.

9. Pneumatic brake booster as claimed in claim 7, wherein the radial inside surface and a radial outside surface of the sealing bead are provided with a conical configuration.

10. Pneumatic brake booster as claimed in claim 6, wherein the ribs are arranged opposite each other on the radial inside surface and the radial outside surface.

* * * * *